May 26, 1959     E. F. PEVERE     2,888,500
RECOVERY AND UTILIZATION OF PROPYLENE FROM LEAN GAS
Filed Nov. 23, 1954
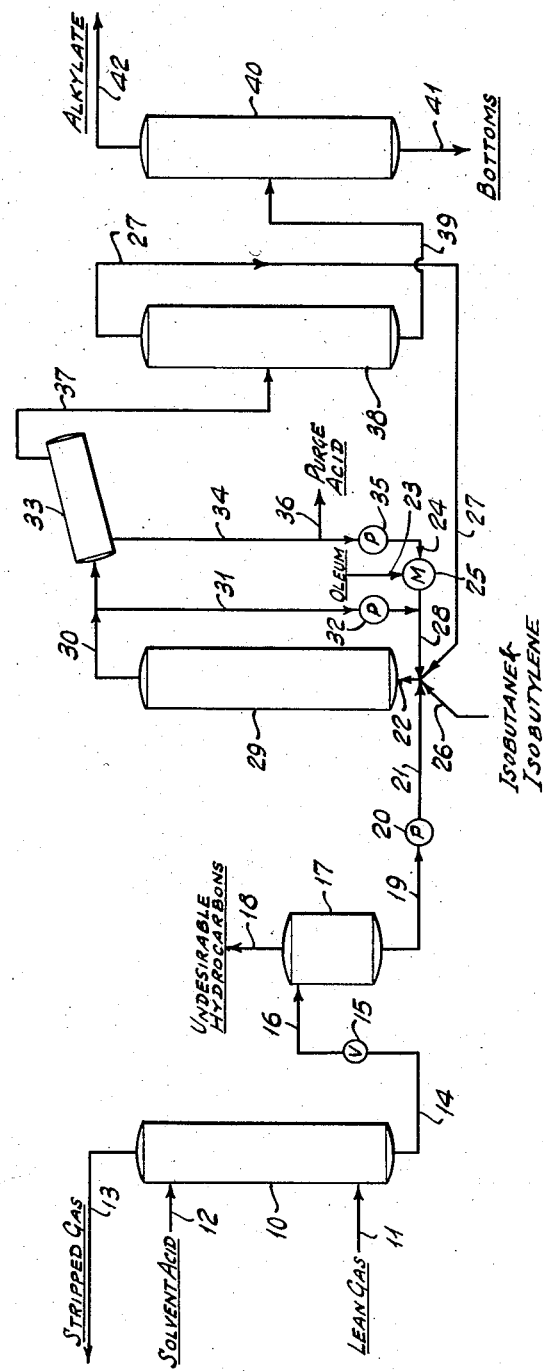

United States Patent Office 2,888,500
Patented May 26, 1959

2,888,500
RECOVERY AND UTILIZATION OF PROPYLENE FROM LEAN GAS

Ernest F. Pevere, Beacon, N.Y., assignor to The Texas Company, New York, N.Y., a corporation of Delaware Application November 23, 1954, Serial No. 470,583

4 Claims. (Cl. 260—683.61)

This invention relates to a process for alkylating isoparaffin with propylene recovered from lean gas streams, i.e. gas streams consisting essentially of propylene in admixture with other normally gaseous hydrocarbons. Such gas streams usually contain, in addition to propylene, methane, ethylene, propane and small amounts of $C_4$ hydrocarbons. Such gas streams rarely have net heating value greater than about 2500 B.t.u. per cubic foot and are generally in the range of about 1800-2300 B.t.u. per cubic foot.

In essence my process comprises: contacting at 30°–100° F. said lean gas with aqueous absorbing solution having sulfuric acid concentration less than 90 weight percent but not substantially below 80 weight percent in the ratio of at least ½ mol of sulfuric acid per mol of $C_3$ and higher olefins initially present in said lean gas, thereby forming an absorbing solution enriched in alkyl sulfates of said $C_3$ and higher olefins without appreciable side reaction; conditioning the enriched absorbing solution for alkylation by separating therefrom entrained hydrocarbon gases; fortifying the conditioned absorbing solution with sulfur trioxide-providing material in amount suffiicent to establish and maintain acid strength of the aqueous acid fraction of the resulting mixture above 90 weight percent sulfuric acid; and alkylating an isoparaffin with the resulting mixture under alkylating conditions to produce a branch chain saturated hydrocarbon compound.

Lean gases suitable for my treatment ordinarily are available on refinery premises from absorbing operations, from the cracking of hydrocarbon oils or gases, from the destructive hydrogenation of heavy hydrocarbons, from the dehydrogenation of normally liquid or normally gaseous hydrocarbons, or from special converting operations such as the synthesis of hydrocarbon oils from water gas.

Attempts to alkylate isobutane with propylene recovered from such lean gas streams by absorption in alkylation strength sulfuric acid generally have resulted in a high acid requirement, e.g. production of about 2½-5 volumes of alkylate per volume of acid. The absorbing and conditioning steps of my process coact to suppress side reactions and thereby reduce acid requirement in the isoparaffin alkylation.

Thus, by contacting the lean gas with aqueous sulfuric acid in accordance with the invention process, only the $C_3$ and higher olefins of the lean gas are absorbed as alkyl sulfates in the absorbing solution. Most of the ethylene is vented along with the depleted lean gas. The acid strength of my absorbing solution prevents olefins such as isobutylene, which is absorbed in the acid together with the propylene and various other hydrocarbons, from undergoing appreciable undesirable side reactions such as hydropolymerization in the enriched absorbing solution, and also prevents appreciable hydrolysis of or release of the higher olefins from occurring at this point or in the steps which follow.

Pressure during absorption is, suitably, superatmospheric, say 200 p.s.i.g. but need not be above atmospheric to be effective. For simplicity of later conditioning absorbing pressure of about 150 p.s.i.g. is preferred. Advantageously, strength of the absorbing acid used is between about 80 and about 88 weight percent and preferably, for efficiency and economy in the practice of my process, 85% sulfuric acid is used for the absorption. Use of absorbing solution substantially below about 80% acid strength is unsatisfactory for effective propylene absorption and has the practical disadvantage of requiring extensive fortification to bring the enriched absorbing solution up to alkylation strength. On the other hand, use of absorbing solution of about 90% acid strength or greater tends to cause substantial undesirable side reactions such as hydropolymerization.

Absorption can be performed at temperature from about 30–100° F., and preferably at about 70° F. to allow water cooling. Preferably, countercurrent contact is maintained between the gas and the acid. In the contacting operation it is preferred to use at least ½ mol of sulfuric acid and especially ½ to 1 mol of sulfuric acid per mol of $C_3$ and higher olefins initially present in the lean gas fed with average acid:gas contact time of 5 to 30 seconds.

However, in the absorbing operation substantial amounts of various normally gaseous undesirable hydrocarbons such as ethylene, ethane, propane and isobutane are physically dissolved or otherwise entrained in the absorbing solution, particularly if the absorption is operated to produce an acid effluent very rich in olefin-sulfuric acid compounds, i.e. dialkyl sulfates. If the entrained saturated lower hydrocarbons carry through the entire alkylation operation, they must be fractionated from the alkylate product at substantial expense to obtain the most desirable quality of alkylate. In addition, the presence of ethylene in the enriched absorbing solution drastically reduces acid life obtainable in the alkylation operation.

At this juncture of my process the enriched absorbing solution is conditioned for alkylation by the separation of a preponderant fraction of, e.g. at least about 90 mol percent of, these entrained undesirable hydrocarbon gases from the enriched absorbing solution. Conditioning is done most simply by passing the enriched solution into a zone wherein the total pressure over the solution is maintained substantially below that used in the absorption, e.g. below 5 p.s.i.g. after absorbing at about 150 p.s.i.g., thereby flashing off these entrained hydrocarbon gases. The conditioning can be assisted materially by contacting enriched solution with a stream of inert gas such as nitrogen and/or raising the solution temperature as high as possible for a period of time consistent with the avoidance of significant side reactions, e.g. 30 seconds at 90° F. For efficiency and economy in the conditioning operation a packed column flashing vessel is used. Preferred flashing conditions are as follows: time, about 20 to about 60 seconds; temperature maintained between 70° and 100° F.; and total pressure maintained in the range of 0 to 5 pounds per square inch gauge. Thus conditioned, the enriched absorbing solution is reasonably stable and may be stored for an appreciable period of hours without significant hydropolymerization or other undesirable side reaction. Alternatively, the conditioned solution is passed intermittently or continuously into the alkylation phase of the process.

As there is appreciable water in the conditioned absorbing solution fed to the alkylation reactor, fortification of the acid in the alkylation reaction mixture is necessary to establish and maintain its strength (as measured in the separatable acid fraction of the alkylation reaction mixture) above 90 weight percent, advantageously between 92 and 96 and preferably at about 93%. Suitable sulfur trioxide providing materials for the fortification operation of my process are, for example, sulfuric acid of 98% strength and higher (including fuming sulfuric acid or oleum) and sulfur trioxide itself. Fortification must be accomplished with good mixing and under conditions controlled to prevent local overheating.

While isoparaffins such as isobutane and isopentane can be alkylated by the practice of my process, the preferred isoparaffin is isobutane for making high antiknock motor fuel hydrocarbons. When this isoparaffin is promoted with butylenes or butylene polymers, particularly with isobutylene in amount between 5 and 15% by weight of the absorbed propylene being fed, the alkylation will proceed in the presence of 93% sulfuric acid at temperatures between about 40° and about 125° F., and is particularly rapid and efficient in the preferred temperature range of about 65°–80° F. Thus, such promotion is preferred for the alkylation. Sufficient pressure is maintained on the alkylation reactor to retain the hydrocarbons therein in liquid phase, for example about 30 to 150 p.s.i.g. Time required for the alkylation reaction is between about 20 and about 60 minutes with good mixing being maintained in the reactor. Isoparaffin such as isobutane is introduced in amount that the mol ratio of isobutane to propylene in the alkylation reaction mixture is in excess of 1:1 and is preferably between about 3:1 and 5:1. The amount of acid in the alkylation reaction mixture can be from about 40–80 volume percent of the total alkylation reaction mixture.

The invention will be understood more clearly from the following detailed description read in connection with the drawing which is the preferred flow scheme for my improved process. Transfer pumps and compressors, agitators, heat exchange equipment and receiving tanks are to be supplied, of course, where necessary or desirable. While equipment items are illustrated in the singular, it is to be understood that a plurality of similar items can be used in series or in parallel. Temperatures are expressed in degrees Fahrenheit; pressures are expressed in pounds per square inch gage; gas compositions are expressed in volume percent; gas flows are referred to standard conditions of 60° F. and one atmosphere total pressure; and flow rates are essentially constant throughout operation.

Referring to the drawing, lean gas containing 22.6% propylene, 4.0% methane, 24.0% ethane, 2.5% ethylene, 46.1% propane and 0.8% $C_4$ hydrocarbons is passed into the base of absorber 10 through line 11 at the rate of 1000 cubic feet per hour. Simultaneously, solvent acid, 85 weight percent aqueous $H_2SO_4$, is admitted into the top of absorber 10 through line 12 at the rate of 36.2 pounds per hour and into countercurrent contact with the inlet gas. Absorbing pressure is maintained at 150; absorbing temperature is maintained at 70° by cooling means not shown. Average time of gas-liquid contact is about 5 seconds. In the absorbing operation about 95 volume percent of the propylene and higher olefins initially present in the lean gas are absorbed as alkyl sulfates in the solvent acid. Some ethylene and saturated hydrocarbons, e.g. ethane, propane and isobutane, are entrained in the solvent; the remainder of the so-depleted lean gas is vented through pipe 13 for fuel or other use.

The hydrocarbon-enriched solvent is withdrawn from the base of absorber 10 through line 14, and pressure is reduced thereover by means of pressure reducing valve 15. Enriched solvent under pressure of 0 flows through line 16 into flash tower 17 wherein more than 90 mol percent of the undesirable entrained hydrocarbons such as ethane, ethylene and propane are desorbed and vented off through line 18. The contents of tower 17 are maintained at about 70° by means of heat transfer apparatus not shown. Thus conditioned, the enriched solvent flows from tower 17 through line 19. It is raised to slightly above alkylation pressure by pump 20 and passed through line 21 into header 22.

Simultaneously, 37.6 pounds per hour of isobutane and 2.7 pounds per hour of isobutylene are passed into header 22 from pipe 26. A recycle flow of 74.9 pounds per hour of separated unreacted isobutane recovered in a later stage of the process is fed through line 27 into header 22. Header 22 also collects, from line 28, a recycle flow of fortified alkylation acid, about 17 gallons per hour, from mixer 25 and a recycle flow of alkylation emulsion, about 20 gallons per minute from line 31. From line 23 there is admitted into mixer 25 13.4 pounds per hour of 65% oleum for fortification of the recycle acid, this amount being sufficient to establish and maintain acid strength of the resulting acid fraction in the alkylation mixture substantially constant at about 93 weight percent throughout the alkylation operation, said acid strength being measured in the separatable aqueous acid fraction of the mixture exclusive of its hydrocarbon content. Contents of mixer 25 also discharge into header 22 through line 28.

The mixed flows in header 22 are passed into alkylation time tank 29 containing an alkylation reaction mixture comprising about 50% by volume of 93 weight percent sulfuric acid from previous operation. Tank 29 is equipped with an agitator and temperature control means not shown. Alkylation temperature is maintained at about 70° and alkylation pressure about 50. Average residence time of the reactants in the alkylation reactor system is about 20 minutes. The alkylation mixture is withdrawn from tank 29 through line 30. Emulsion is recycled through line 31 and pump 32 into line 28 as previously described. The balance of the reaction mixture is passed into settler 33 wherein it stratifies into a hydrocarbon layer and an aqueous acid layer. The acid layer is separated and recycled through line 34 and pump 35 into mixer 25 as previously described. A sufficient amount of the separated alkylation acid layer is withdrawn continuously from line 34 by means of discharge 36 to maintain acid volume in the alkylation settler substantially constant throughout operation. The withdrawn acid can be, for example, re-used in $C_4$ olefin alkylation or subjected to recovery processing.

The hydrocarbon layer is withdrawn from settling tank 33 through line 37 and passed into isobutane stripper 38. Light hydrocarbons, principally unreacted isobutane, are recovered herein and recycled through line 27 as previously described. The stripped hydrocarbon flows through line 39 into alkylate fractionator 40 wherein it is separated into an alkylate product about 11 gallons per hour of principally isoheptanes, and residual material or bottoms. The bottoms are withdrawn from fractionator 40 through line 41 and the alkylate product is withdrawn from fractionator 40 through line 42. Production of about 13.4 volumes of alkylate per volume of oleum charged is obtained.

Obviously many modifications and variations of the invention as hereinbefore set forth may be made without departing from the spirit and scope of the invention and therefore only such limitations may be imposed as are indicated in the appended claims.

I claim:

1. A process for alkylating isoparaffin with propylene recovered from lean gas, said lean gas consisting essentially of propylene in admixture with other normally gaseous hydrocarbons including ethylene, said process comprising: contacting at 30°–100° F. and superatmospheric pressure said lean gas with aqueous absorbing solution having sulfuric acid concentration less than 90 weight percent but not substantially below 80 weight percent in the ratio of at least one-half mol of sulfuric acid per mol of $C_3$ and higher olefins initially present in said lean gas, thereby forming an absorbing solution enriched with alkyl sulfates of $C_3$ and higher olefins without appreciable side reaction; stripping entrained hydrocarbon gases from the enriched absorbing solution for alkylation at a pressure substantially below the lean gas-sulfuric acid contacting pressure; fortifying, under conditions controlled to prevent local overheating, the stripped absorbing solution with sulfur trioxide-providing material in an amount sufficient to establish and maintain acid strength of the aqueous acid fraction of the resulting mixture above 90 weight percent sulfuric acid; and alkylating an isoparaffin with the resulting mixture under alkylating conditions to produce a branch chain saturated hydrocarbon compound.

2. The process of claim 1 wherein the sulfuric acid concentration of said absorbing solution is 80–88%, the absorbing pressure is maintained at about 150 p.s.i.g., and said enriched absorbing solution is conditioned by reducing pressure thereover to a value below about 5 p.s.i.g.

3. The process of claim 1 wherein sulfuric acid concentration of the absorbing solution is about 85%, the acid strength of the aqueous acid fraction of the resulting mixture for alkylation is established and maintained at about 93% by fortification with oleum, and the alkylation temperature is not in excess of 125° F.

4. The process of claim 1 wherein the sulfuric acid concentration of the absorbing solution is about 85%, the acid strength of the aqueous acid fraction of the resulting mixture for alkylation is established and maintained at about 93% by fortification with sulfur trioxide, and the alkylation temperature is not in excess of 125° F.

References Cited in the file of this patent

UNITED STATES PATENTS

| | | |
|---|---|---|
| 2,242,845 | Blount | May 20, 1941 |
| 2,244,556 | Holm et al. | June 3, 1941 |
| 2,319,209 | Carmody | May 18, 1943 |
| 2,320,336 | Bruner et al. | June 1, 1943 |
| 2,361,465 | Filbert | Oct. 31, 1944 |
| 2,361,600 | Carmody | Oct. 31, 1944 |
| 2,379,751 | Russell | July 3, 1945 |
| 2,385,123 | Atkins | Sept. 18, 1945 |
| 2,387,162 | Matuszak | Oct. 16, 1945 |
| 2,649,486 | Putney | Aug. 18, 1953 |